US012810007B2

(12) United States Patent
Vemuri et al.

(10) Patent No.: US 12,810,007 B2
(45) Date of Patent: Nov. 24, 2026

(54) OPTIMIZATION AND MANAGEMENT OF DIGITAL ACCESS SYSTEMS FOR VEHICLES

(71) Applicant: GM GLOBAL TECHNOLOGY OPERATIONS LLC, Detroit, MI (US)

(72) Inventors: Vikas Vemuri, Farmington Hills, MI (US); Scott Thomas Droste, West Bloomfield, MI (US); Azin Neishaboori, Plymouth, MI (US); John Sergakis, Bloomfield Hills, MI (US); Andrew J. MacDonald, Grosse Pointe Park, MI (US); Paolo Giusto, Brentwood, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 24 days.

(21) Appl. No.: 18/817,468

(22) Filed: Aug. 28, 2024

(65) Prior Publication Data

US 2026/0064868 A1 Mar. 5, 2026

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
USPC ........................................................... 726/17
See application file for complete search history.

(56) References Cited

U.S. PATENT DOCUMENTS 11,044,618 B2* 6/2021 Cui ....................... H04W 24/08
2009/0262709 A1* 10/2009 Mason ................. H04W 36/06 370/336
2022/0254206 A1* 8/2022 Dykstra ................... G07C 9/27
2024/0075903 A1* 3/2024 Choi ........................ B60R 25/24
2024/0169080 A1* 5/2024 Gowda ............... G06F 21/6218
(Continued)

FOREIGN PATENT DOCUMENTS

CN 117429386 A 1/2024
CN 117979239 A 5/2024

OTHER PUBLICATIONS

German Office Action for German Application No. 102024129564.3; dated Jun. 23, 2025; 8 pages.

*Primary Examiner* — Michael S McNally
(74) *Attorney, Agent, or Firm* — CANTOR COLBURN LLP

(57) ABSTRACT

Examples described herein provide a method for optimization and management of a digital access system for a vehicle. The method includes monitoring a digital access function of the digital access system of the vehicle to detect an event. The method further includes determining, using a state assessment optimizer, whether the event indicates a failure of the digital access function of the digital access system. The method further includes, responsive to determining that the event indicates a failure of the digital access function of the digital access system, assessing, using the state assessment optimizer, sub-events of the event that failed, evaluating, using the state assessment optimizer and based at least in part on the sub-events of the event that failed, other communication technologies to identify an alternative communication technology and re-executing, using the alternative communication technology, the digital access function that failed.

19 Claims, 5 Drawing Sheets

(56) References Cited

U.S. PATENT DOCUMENTS

| | | | | |
|---|---|---|---|---|
| 2025/0115150 | A1* | 4/2025 | Truluck | B60L 53/68 |
| 2025/0249749 | A1* | 8/2025 | Salter | B60L 1/00 |

* cited by examiner

OPTIMIZATION AND MANAGEMENT OF DIGITAL ACCESS SYSTEMS FOR VEHICLES

BACKGROUND

The subject disclosure relates to vehicles, and in particular to optimization and management of digital access systems for vehicles.

Modern vehicles (e.g., a car, a motorcycle, a boat, or any other type of automobile) may be equipped to electronically communicate with other devices.

Vehicles can communicate with the other devices using various communications technologies and/or communications protocols. For example, a vehicle can communicate with another device via cellular networks, Wi-Fi networks, Bluetooth® connections, ultrawideband (UWB) networks, and/or the like, including combinations and/or multiples thereof. It is desirable to optimize the management of digital access systems in vehicles.

SUMMARY

In one embodiment, a method for optimization and management of a digital access system for a vehicle is provided. The method monitoring a digital access function of the digital access system of the vehicle to detect an event. The method further includes determining, using a state assessment optimizer, whether the event indicates a failure of the digital access function of the digital access system. The method further includes, responsive to determining that the event indicates a failure of the digital access function of the digital access system, assessing, using the state assessment optimizer, sub-events of the event that failed, evaluating, using the state assessment optimizer and based at least in part on the sub-events of the event that failed, other communication technologies to identify an alternative communication technology and re-executing, using the alternative communication technology, the digital access function that failed.

In addition to one or more of the features described herein, or as an alternative, further embodiments of the method may include, responsive to determining that the event does not indicate a failure of the digital access function of the digital access system, assessing, using the state assessment optimizer, sub-events of the event that passed.

In addition to one or more of the features described herein, or as an alternative, further embodiments of the method may include optimizing parameters used for execution of sub-functions corresponding to the sub-events for a subsequent digital access function.

In addition to one or more of the features described herein, or as an alternative, further embodiments of the method may include that the alternative communication technology is identified based on a latency for an initially implemented communication technology being greater than a latency threshold.

In addition to one or more of the features described herein, or as an alternative, further embodiments of the method may include that the alternative communication technology is identified based on a packet error rate for an initially implemented communication technology being greater than a packet error rate threshold.

In addition to one or more of the features described herein, or as an alternative, further embodiments of the method may include, subsequent to determining whether the event indicates the failure of the digital access function of the digital access system, reporting the event to the state assessment optimizer.

In addition to one or more of the features described herein, or as an alternative, further embodiments of the method may include that the state assessment optimizer applies a machine learning technique.

In addition to one or more of the features described herein, or as an alternative, further embodiments of the method may include that the machine learning technique utilizes a reinforcement learning architecture or a neural network architecture.

In addition to one or more of the features described herein, or as an alternative, further embodiments of the method may include that the state assessment optimizer takes as input external factors relating to the digital access function, information about a subsequent digital access function, and static rules.

In addition to one or more of the features described herein, or as an alternative, further embodiments of the method may include that the digital access function is a digital key function for the vehicle.

In addition to one or more of the features described herein, or as an alternative, further embodiments of the method may include that the digital access function is an electrical charger interface function for the vehicle.

In another embodiment, a vehicle that includes a digital access system is provided. The digital access system includes a memory having computer readable instructions and a processing device for executing the computer readable instructions, the computer readable instructions controlling the digital access system to perform operations. The operations include monitoring a digital access function of the digital access system of the vehicle to detect an event. The operations further include determining, using a state assessment optimizer, whether the event indicates a failure of the digital access function of the digital access system. The operations further include, responsive to determining that the event indicates a failure of the digital access function of the digital access system, assessing, using the state assessment optimizer, sub-events of the event that failed, evaluating, using the state assessment optimizer, other communication technologies to identify an alternative communication technology and re-executing, using the alternative communication technology, the digital access function that failed.

In addition to one or more of the features described herein, or as an alternative, further embodiments of the vehicle may include that the operations further include, responsive to determining that the event does not indicate a failure of the digital access function of the digital access system, assessing, using the state assessment optimizer, sub-events of the event that passed, and optimizing parameters for execution of sub-functions corresponding to the sub-events for a subsequent digital access function.

In addition to one or more of the features described herein, or as an alternative, further embodiments of the vehicle may include that the alternative communication technology is identified based on a latency for an initially implemented communication technology being greater than a latency threshold and based on a packet error rate for the initially implemented communication technology being greater than a packet error rate threshold.

In addition to one or more of the features described herein, or as an alternative, further embodiments of the vehicle may include that the alternative communication technology is identified based at least in part on the sub-events of the event that failed.

In addition to one or more of the features described herein, or as an alternative, further embodiments of the vehicle may include that the operations further include, subsequent to determining whether the event indicates the failure of the digital access function of the digital access system, reporting the event to the state assessment optimizer.

In addition to one or more of the features described herein, or as an alternative, further embodiments of the vehicle may include that the state assessment optimizer applies a machine learning technique.

In another embodiment a computer program product is provided. The computer program product includes a computer readable storage medium having program instructions embodied therewith, the program instructions executable by at least one processor to cause the at least one processor to perform operations for optimization and management of a digital access system for a vehicle. The operations include monitoring a digital access function of the digital access system of the vehicle to detect an event. The operations further include reporting the event to a state assessment optimizer. The operations further include determining, using the state assessment optimizer, whether the event indicates a failure of the digital access function of the digital access system. The operations further include, responsive to determining that the event indicates a failure of the digital access function of the digital access system, assessing, using the state assessment optimizer, sub-events of the event that failed and evaluating, using the state assessment optimizer, other communication technologies to identify an alternative communication technology and re-executing, using the alternative communication technology, the digital access function that failed. The operations further include, responsive to determining that the event does not indicate a failure of the digital access function of the digital access system, assessing, using the state assessment optimizer, sub-events of the event that passed and optimizing parameters used for execution of sub-functions corresponding to the sub-events for a subsequent digital access function.

In addition to one or more of the features described herein, or as an alternative, further embodiments of the computer program product may include that the alternative communication technology is identified based at least in part on the sub-events of the event that failed.

In addition to one or more of the features described herein, or as an alternative, further embodiments of the computer program product may include that the state assessment optimizer applies a machine learning technique.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
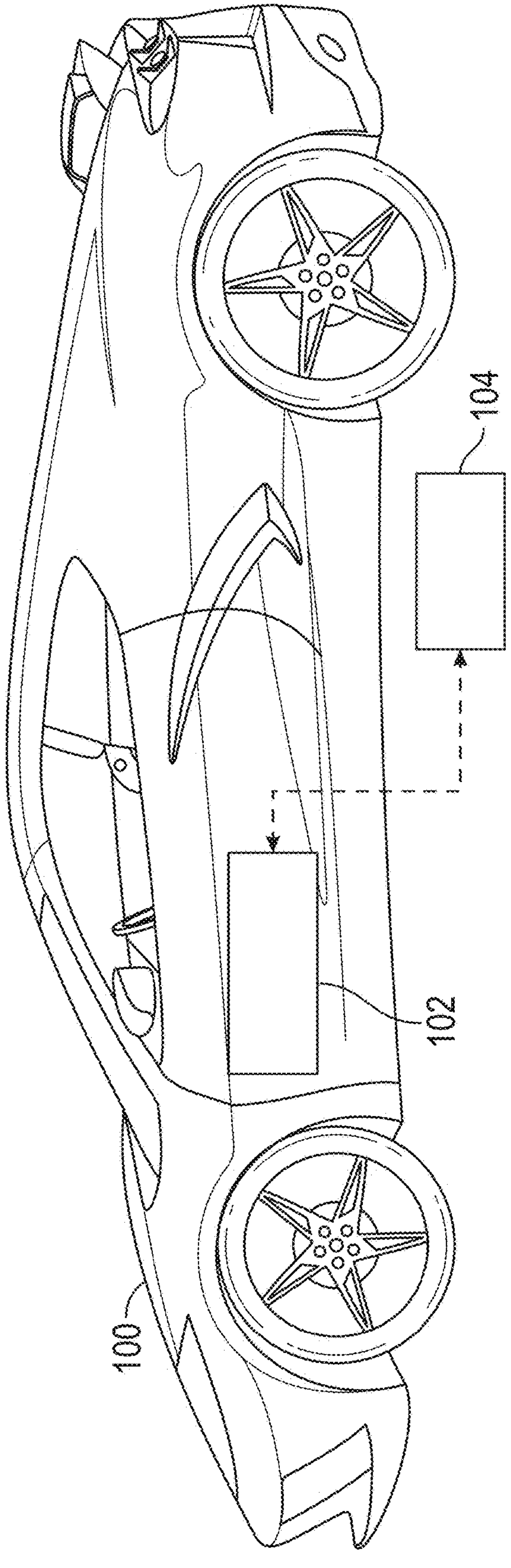
FIG. 1 is an illustration of a vehicle having a digital access system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein relates to optimization and management of digital access systems for vehicles. Vehicles can provide digital access systems, which are enabled by a set of communication technologies and protocols that provide digital or electronic means of accessing and controlling a vehicle, typically using a user device, such as a smartphone, laptop computer, tablet computer, smartwatch or other wearable computing device, and/or the like, including combinations and/or multiples thereof. Digital access systems can also enable the vehicle to communicate and interface with other devices, such as charging stations, which provide electrical power to vehicles.

Existing digital access systems do not have dynamic feature fault assessment and management mechanisms, which results in poor user experiences, and poor performance. For example, suboptimal or otherwise inefficient communication technologies and protocols may be implemented where better, more efficient technologies or protocols exist. For example, although a cellular communication link may appear to be functioning correctly, a link with lower packet error rate, lower latency, or higher throughput (e.g., Wi-Fi) might be available for use.

One or more embodiments described herein address these and other shortcomings by providing for optimization and management of digital access systems for vehicles. One or more embodiments detect fault events and, when detected, evaluate alternative communication technologies to implement to improve or eliminate the fault events. One or more embodiments provide for assessing feature and technology fault states dynamically and based on estimates, optimizing the digital access mechanism from a digital access system. According to one or more embodiments, smart logic and datasets are used to dynamically manage feature states for optimal performance. For example, based on the holistic digital access instance, one or more embodiments provide for dynamically managing the access selection of a communications technology. In one or more embodiments, such dynamic management is implemented as a cloud-based solution that considers various digital access performance results and those results can be fed into a machine learning based model that identifies a sequence of optimal alternatives. One or more embodiments provide a state assessment optimizer that dynamically monitors digital access functional blocks of operation and reports states of each functional block to the state assessment optimizer when events occur.

It should be appreciated that the functioning of a vehicle implementing one or more of the embodiments described herein is improved. For example, embodiments described herein provide for the functioning of digital access systems (e.g., computing systems that provide digital access functionality) by evaluating and selecting communications technologies based on the performance of the communications technologies. This enables a more suitable communication technology to be implemented even where other communications technologies may be available and may be satisfactory but do not provide an optimal user experience. As a result, the digital access system is improved because it can facilitate communications faster, more reliably, with lower latency, and/or the like, including combinations and/or multiples thereof.

FIG. 1 is an illustration of a vehicle 100 having a digital access system 102 for providing optimization and management of digital access systems for vehicles according to one or more embodiments.

The vehicle 100 can be a car, a truck, a van, a bus, a motorcycle, a boat, or any other type of automobile. According to an embodiment, the vehicle 100 includes an internal combustion engine (not shown) fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

According to one or more embodiments, the vehicle 100 includes the digital access system 102, which communicates with a user device 104. The digital access system 102 can support multiple communications technologies and/or communications protocols. For example, the digital access system 102 can communicate with the user device 104 via cellular networks, Wi-Fi networks, Bluetooth® connections, ultrawideband (UWB) networks, and/or the like, including combinations and/or multiples thereof. The digital access system 102 can support various functions and features, such as a digital key function.

The user device 104 can be any suitable device (e.g., a smartphone, a cellular telephone, a laptop computer, a tablet computer, and/or the like, including combinations and/or multiples thereof) configured to communicate with the vehicle. For example, the user device 104 (e.g., a smartphone) can be configured to act as a digital key for the vehicle 100. A digital key is a technology that enables the user device to perform vehicle operations, such as unlocking/locking the vehicle, starting the vehicle, enabling/disabling a security system of the vehicle, remotely controlling the vehicle, and/or the like, including combinations and/or multiples thereof. As another example, the vehicle 100 can communicate with another device, such as a charging station (not shown) to provide electrical power to the vehicle (e.g., where the vehicle is a plug-in hybrid electric vehicle, an electric vehicle, and/or the like, including combinations and/or multiples thereof). According to one or more embodiments, the user device 104 is a vehicle electronic control unit (ECU).

Further features of the digital access system 102 are now described with reference to FIGS. 2 and 3.

Figure 2:
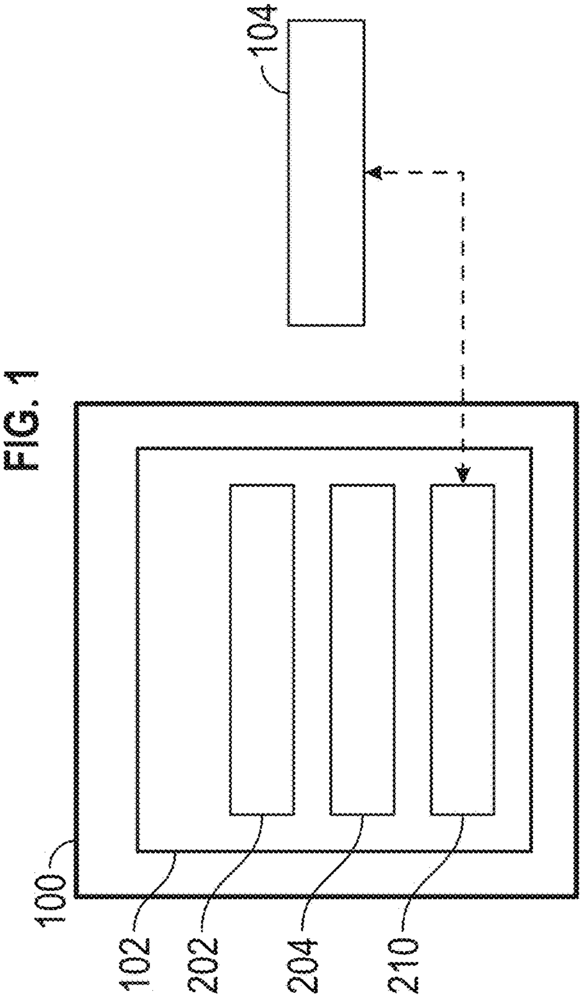
FIG. 2 is a block diagram of the digital access system of FIG. 1 according to one or more embodiments.

Particularly, FIG. 2 is a block diagram of the digital access system 102 of FIG. 1 according to one or more embodiments. According to one or more embodiments, the digital access system 102 provides a digital key functionality via the user device 104 for the vehicle 100. The digital access system 102 includes a processing device 202, a memory 204, and an assessment engine 210. It should be appreciated that the digital access system 102 can be any device suitable for providing digital key functionality or the like. For example, the digital access system 102 can be a device implemented in or otherwise associated with the vehicle 100. As another example, the digital access system 102 can be a smartphone, tablet computer, laptop computer, desktop computer, wearable computing device, and/or the like, including combinations and/or multiples thereof. As yet another example, the digital access system 102 can be the processing system 600 of FIG. 6 and/or can include one or more components of the processing system 600 of FIG. 6.

The processing device 202 is any suitable processing circuitry for processing data (e.g., localization data and/or communication data) and/or instructions. The processing device 202 is an example of one or more of the processing devices 621 of FIG. 6, as described in more detail herein.

The memory 204 is any suitable device for storing data and/or instructions. The memory 204 is an example of one or more of the system memory 622, the random access memory 623, and/or the read-only memory 624 of FIG. 6, as described in more detail herein.

The assessment engine 210 provides for optimization and management of the digital access system 102. For example, the assessment engine 210 detects fault events and, when detected, evaluates alternative communication technologies to implement to improve or eliminate the fault events. Features and functionality of the assessment engine 210 are now described in more detail with reference to FIGS. 3 and 4.

Figure 3:
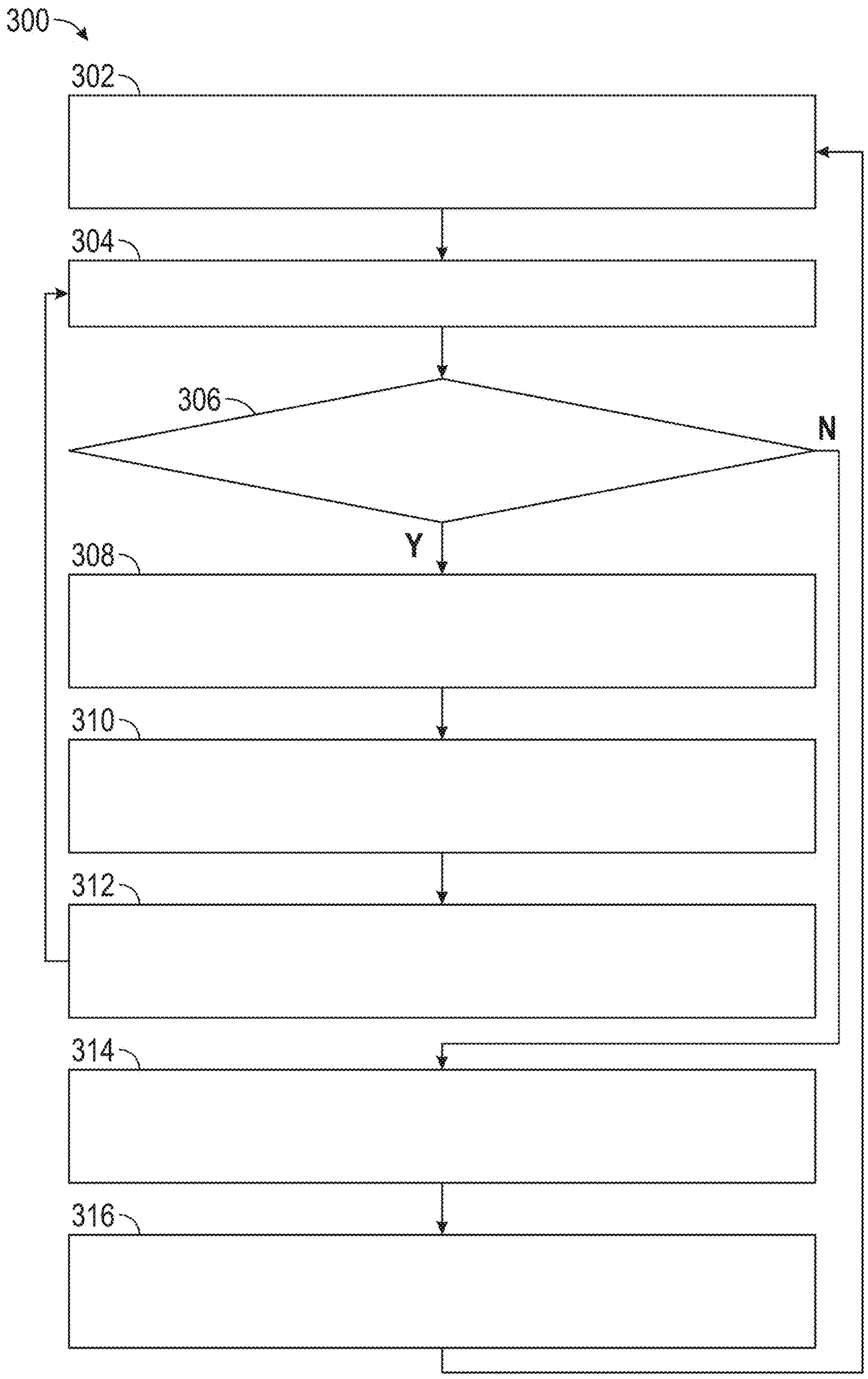
FIG. 3 is a flow diagram of a method for optimization and management of digital access systems for vehicles according to one or more embodiments.
Figure 4:
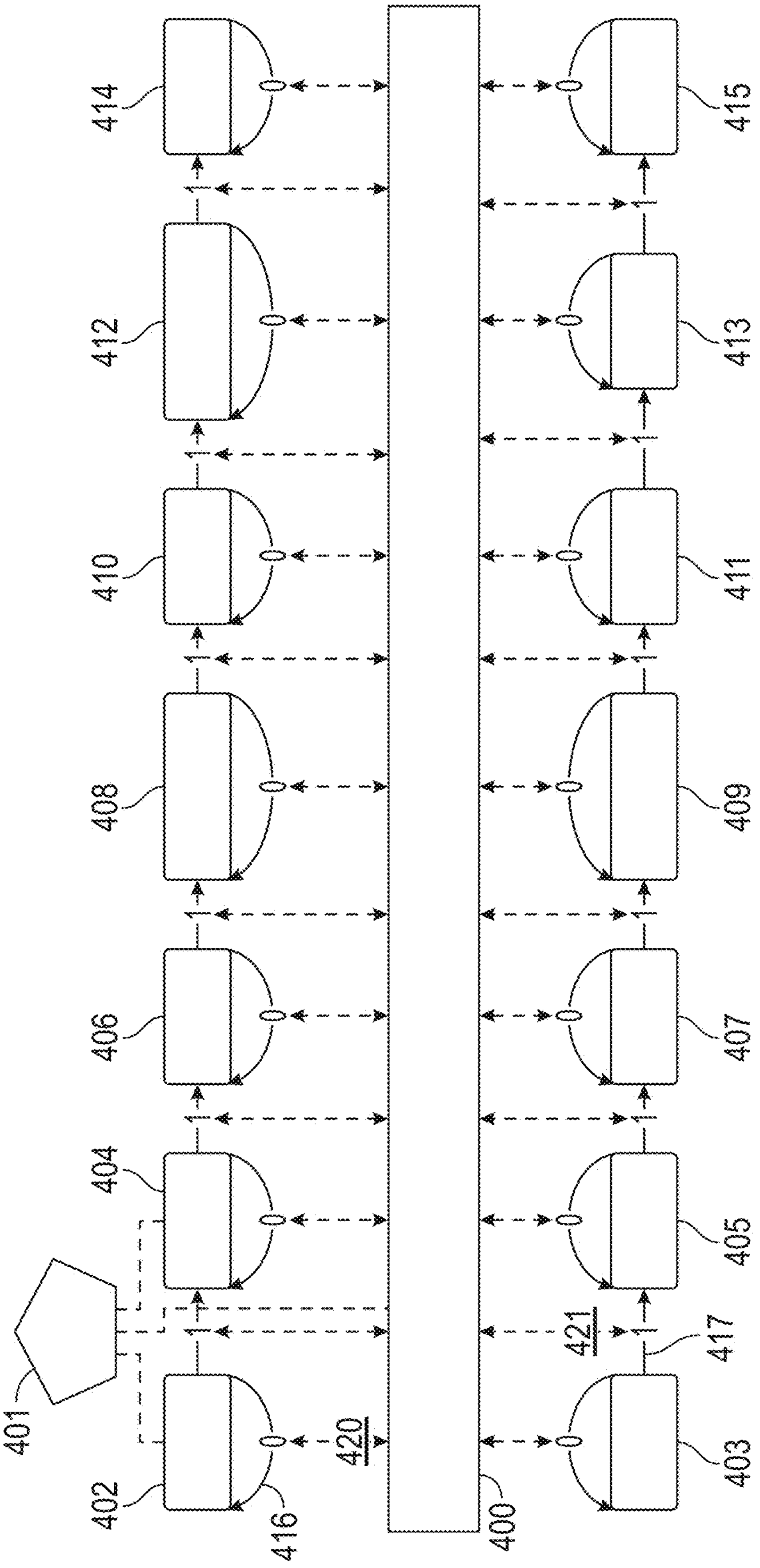
FIG. 4 is a block diagram of a state assessment optimizer according to one or more embodiments.

FIG. 3 is a flow diagram of a method 300 for optimization and management of digital access systems (e.g. the digital access system 102) for vehicles (e.g., the vehicle 100) according to one or more embodiments. The method 300 can be implemented using any suitable system or device. For example, the method 300 can be implemented using the digital access system 102 of FIGS. 1 and 2, by the state assessment optimizer 400 of FIG. 4, by the processing system 600 of FIG. 6, and/or the like, including combinations and/or multiples thereof. The method 300 is now described with reference to FIG. 4 but is not so limited. Particularly, FIG. 4 is a block diagram of a state assessment optimizer 400 according to one or more embodiments. The state assessment optimizer 400 dynamically monitors digital access functional blocks of operation, which are representative of digital access functions, and reports states of each functional block to the state assessment optimizer when each functional block is executed (e.g., functional blocks 402-415 as described herein). More particularly, the functional blocks 402-415 each represent a digital access function (e.g., functional block 402 represents a "register" digital access function), and each digital access function can include multiple sub-functions that are executed when the digital access function is called. When each sub-function executes, a sub-event occurs that indicates a "pass" or "fail" for the sub-function. When each function executes, an event occurs that indicates a "pass" or "fail" for the digital access function. The state assessment optimizer 400 then sorts each functional state results (the outcome of execution of the functional blocks, known as "events") and runs a sub-event assessment of both pass and fail state after execution of each functional block. The sub-events assessment includes assessing performance of executed sub-functions for the technology used for their execution. For example, performance assessment is done in measuring range, proximity, location, inter-operability functions, and/or the like, including combinations and/or multiples thereof.

With reference to FIG. 3, the method 300 begins at block 302, where the assessment engine 210 monitors a digital access function (e.g., one of the functional blocks 402-415 of FIG. 4) of the digital access system 102 of the vehicle 100 to detect an event. The digital access function can be any function that enables a specific capability or feature within the digital access system 102 that allows users to interact with, gain, and/or control access to a system or device, such as the vehicle 100, using digital methods. Examples of digital access functions include a digital key function, an internet-of-things (IoT) device controller, an electrical charger interface function for the vehicle, and/or the like, including combinations and/or multiples thereof. An event indicates a status (e.g., "pass" or "fail") of a digital access function. Examples of digital access functions include authentication functions (e.g., login attempt), authorization functions (e.g., access granted/denied), access functions (e.g., entry event, exit event), key management functions (e.g., digital key issuance, digital key revocation, key sharing), remote access functions (e.g., remote lock/unlock, remote start/stop), security functions (e.g., tampering or unauthorized access attempt), system management functions (e.g., configuration change, system update, user management), usage functions (e.g., resource utilization, service request), and/or the like, including combinations and/or multiples thereof. According to one or more embodiments, the digital access function can include multiple sub-functions, and the method 300 can include determining whether functions and/or sub-functions were successful based on the associated events and/or sub-events.

At block 304, the assessment engine 210 reports the event to a state assessment optimizer (e.g., the state assessment optimizer 400). According to one or more embodiments, the assessment engine 210 embodies the state assessment optimizer. That is, the assessment engine 210 can perform the features and functionality of the state assessment optimizer. According to one or more embodiments, the assessment engine 210 and the state assessment optimizer are separate components.

At block 306, the assessment engine 210 determines, using a state assessment optimizer (e.g., the state assessment optimizer 400), whether the event indicates a failure of the digital access function of the digital access system 102. Turning now to FIG. 4, digital access functions and events are described in more detail. In this example, a digital access function may include one or more of the following functions: register 402, unregister 403, activate 404, deactivate 405, bind 406, unbind 407, unlock station 408, automate handler action 409, unlock cap 410, lock station 411, automated handler action 412, lock cap 413, share 414, revoke share 415. When a digital access function is performed, an event (e.g., event 416 or event 417) is created indicating a pass (e.g., event 416) or fail (e.g., event 417) of the digital access function. One or more of the events resulting from execution of the digital access function represented by functional blocks 402-415 may involve interfacing with a third-party service or function, such as a service payment 401. The state assessment optimizer 400 monitors the events resulting from execution of the digital access function represented by functional blocks 402-415 to determine whether each function passed ("1") or failed ("0"). According to one or more embodiments, in response to a "pass" event, the digital access system 102 moves to the next state where a next event may be triggered, while in response to a "fail" event, the failed function may be repeated. For example, after activate function 404 passes, the system is in the "Activated" state, and a bind function 406 is triggered in an attempt to move to state "Bound". The state assessment optimizer 400 monitors each of the events (e.g., events 416, 417) not only to determine successes ("pass") and failures ("fail") but also to access sub-events of the sub-functions of the function in the form of fail feedback 420 and/or pass feedback 421. Sub-functions are discrete elements or steps that are performed that collectively make up a function, and each of the sub-functions generates a sub-event indicating whether the sub-function completed successfully.

With continued reference to FIG. 3, if it is determined that the event indicates a failure of the digital access function of the digital access system 102 (block 306 "Yes"), the method 300 proceeds to block 308. At block 308, the assessment engine 210 assesses, using a state assessment optimizer, sub-events of the function that failed. For example, if the event register 402 fails, the state assessment optimizer 400 receives fail feedback 420, which may indicate properties of the digital access system 102 during the failure. Using the fail feedback 420, the state assessment optimizer 400 can analyze the failure to understand why the failure occurred and to identify remedial actions or changes that may result in success ("pass") of the function upon retry.

At block 310, the assessment engine 210 evaluates other communication technologies to identify an alternative communication technology. For example, if a first communication technology (e.g., cellular network) was used between the user device 104 and the digital access system 102 that introduced a high latency (e.g., greater than a threshold latency), the state assessment optimizer 400 may identify a second communication technology (e.g., Wi-Fi or another routing for the cellular network) that is available that provides a reduced latency as compared to latency of the first communication technology. For example, the alternative communication technology is identified based on a latency for an initially implemented communication technology being greater than a latency threshold and/or the packet error rate being greater than a packet error rate threshold.

At block 312, the digital access system 102 uses the alternative communication technology (block 310) to re-execute the digital access function that failed. In such cases, the method 300 returns to block 304 and continues according to one or more embodiments.

If, at block 306, it is determined that the event does not indicate a failure of the digital access function of the digital access system 102 (block 306 "No"), the method 300 proceeds to block 314. At block 314, the assessment engine 210 assesses, using a state assessment optimizer, sub-events of the digital access function that passed. For example, if the function unregister 403 passes, the state assessment optimizer 400 receives pass feedback 421, which may indicate properties of the digital access system 102 during the success. Even though the function unregister 403 passed in this example, the state assessment optimizer 400 can analyze the success and collect performance metrics and to identify potential improvements for the function 403. In an embodiment, the state assessment optimizer 400 can maintain its learnings, and utilize, and update them in future digital access function uses. In an embodiment, to maintain its learnings, the state assessment optimizer 400 uses stable memory on the vehicle 100 to store such information and retrieve the information ahead of future digital access function uses. In an embodiment, remote systems, such as cloud systems, are used to store the learnings of the state assessment optimizer 400. For example, a remote system can be communicatively coupled to the digital access system 102 of the vehicle 100 directly or indirectly, such as via the internet.

At block 316, the assessment engine 210 optimizes sub-event parameters of the sub-events for a subsequent digital key function. Examples of sub-event parameters include technology used to perform the sub-event (e.g., for ranging operation, Bluetooth channel sounding, UWB, or Wi-Fi ranging may be used), the band, channel and bandwidth used in the operation of selected technology (e.g., Wi-Fi and BT may operate in 2.4 GHz, 5 GHz or 6 GHz band), the received signal level threshold at which the sub-event is triggered, and/or the like, including combinations and/or multiples thereof. This provides for improving subsequent digital key functions based on feedback captured by the state assessment optimizer (e.g., the state assessment optimizer 400). According to one or more embodiments, the method 300 then returns to block 302 and continues for subsequent digital key functions.

Additional processes also may be included, and it should be understood that the processes depicted in FIG. 4 represent illustrations, and that other processes may be added, or existing processes may be removed, modified, or rearranged without departing from the scope of the present disclosure. It should also be understood that the processes depicted in FIG. 4 may be implemented as programmatic instructions stored on a non-transitory computer-readable storage medium that, when executed by a processor (e.g., the processing device 202 of FIG. 2, the processor(s) 621 of FIG. 6, and/or the like, including combinations and/or multiples thereof) of a computing system (e.g., the digital access system 102 of FIGS. 1 and 2, the processing system 1100 of FIG. 6, and/or the like, including combinations and/or multiples thereof), cause the processor to perform the processes described herein.

Turning now to further aspects of FIG. 4, the state assessment optimizer 400 can apply one or more machine learning techniques to perform one or more of the functions described herein. According to one or more embodiments, the machine learning technique utilizes a reinforcement learning architecture or a neural network architecture, although other architectures can be used in various embodiments.

According to one or more embodiments, the state assessment optimizer 400 takes as input external factors relating to the digital access function, information about a subsequent digital access function, and static rules. Examples of external factors include: traffic (e.g., low, medium, high), location (e.g., remote, rural, urban), time of day (e.g., quiet, regular, busy, very busy), seasonality (e.g., regular, eventful), vehicle speed (e.g., low, average, high), and/or the like, including combinations and/or multiples thereof. Examples of information about subsequent digital access functions include: traffic (e.g., low, medium, high), location (e.g., remote, rural, urban), time of day (e.g., quiet, regular, busy, very busy), seasonality (e.g., regular, eventful), vehicle speed (e.g., low, average, high), and/or the like, including combinations and/or multiples thereof. Examples of static rules include decisions based on pre-configured values (instead of learned, and dynamic values). For example, in certain locations, or during certain times of the day, not to use a particular technology or protocol.

According to one or more embodiments, the state assessment optimizer 400 uses a vector-based algorithm that takes into account the external factors and other impacting factors (e.g., traffic at current location, traffic at destination, current location, destination location, end-point infrastructure type, surroundings, multi-user scenarios, vehicular motion, time of day, seasonality, and/or the like, including combinations and/or multiples thereof) to rank the alternative communication technologies. The state assessment optimizer 400 may generate a best technology ranking vector representation that represents various technologies (e.g., Wi-Fi, UWB, cellular (e.g., by carrier), Bluetooth® Low Energy, and/or the like, including combinations and/or multiples thereof). For example, the state assessment optimizer 400 can assign a score to each technology (e.g., 0.9 for Wi-Fi, 0.2 for UWB, 0.3 for a first cellular carrier, 0.7 for a second cellular carrier, and/or the like, including combinations and/or multiples thereof) where higher scores represent more favorable technologies. The state assessment optimizer 400 can then select a "best" technology when evaluating the technologies (e.g., block 310 of FIG. 3).

Figure 5:
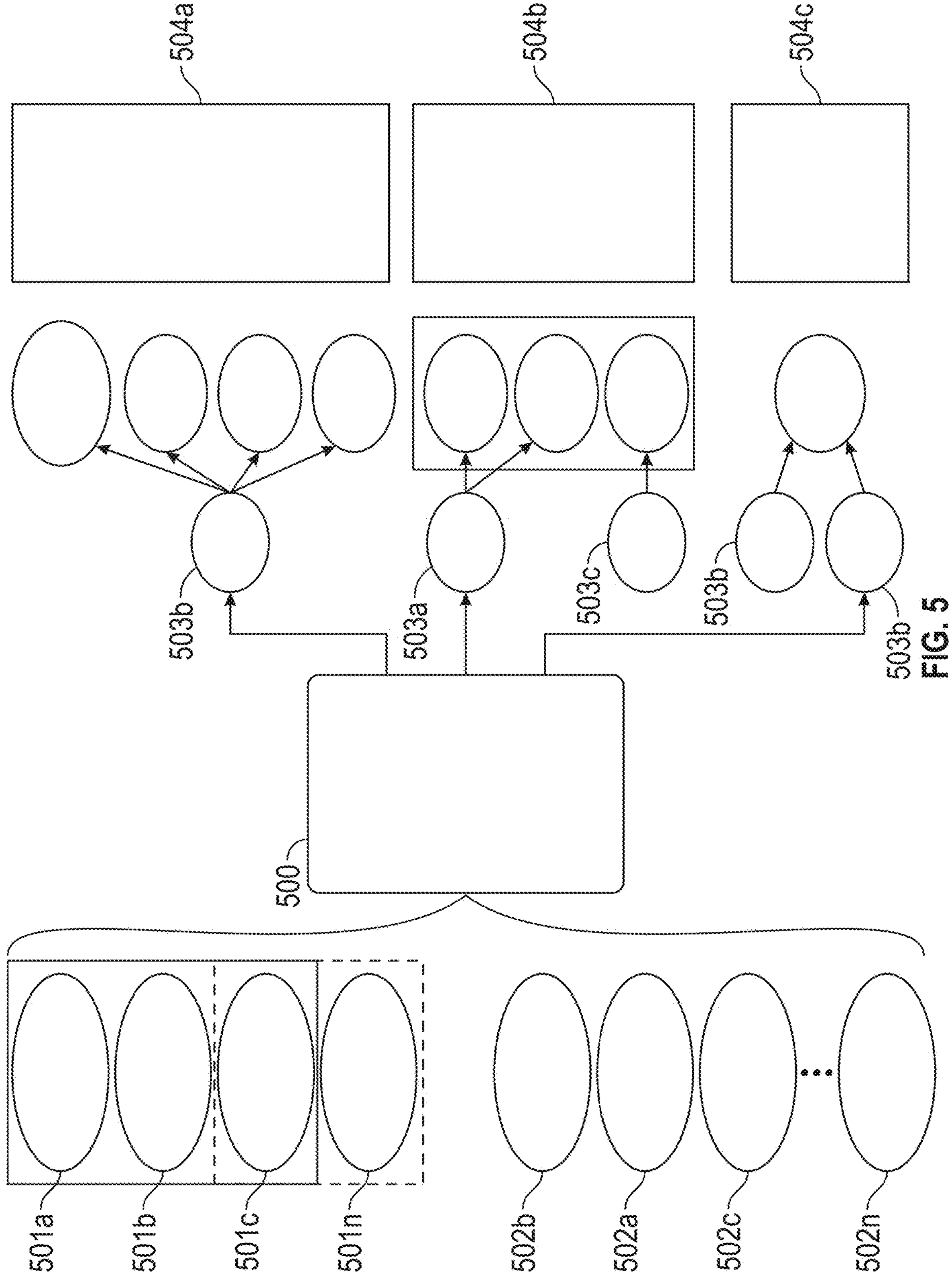
FIG. 5 is a block diagram of a digital access functional store generation and mapping predictor according to one or more embodiments.

FIG. 5 depicts a digital access functional store generation and mapping predictor 500 according to one or more embodiments. The digital access functional store generation and mapping predictor 500 may be implemented by or as part of the assessment engine 210 or as a stand-alone component. The digital access functional store generation and mapping predictor 500 is used to perform functional dependency-based technology mapping. For example, a machine learning model can be used to map digital access functions to other digital access functions' compatibility. The mapping can be based on one or more of the following categories: analogous, common-varied, or varied. The analogous category includes common functions and common technology. The common-varied category includes common functions and varied technology compatibility. The varied category includes varied functionality and technology. Common functions indicate that two or more digital access functions have a commonality while varied functions indicate that two or more digital access functions vary. Common technologies indicate that two or more technologies have a commonality (e.g., cellular) while varied technologies do not have the commonality (e.g., cellular for one technology and Wi-Fi for another technology).

In FIG. 5, the digital access functional store generation and mapping predictor 500 evaluates functions 501*a*-501*n* (collectively "function 501"). Function 501*a* is for a first application, function 501*b* is for a second application, function 501*c* is for a third application, function 504*n* is for an "n"th application.

The digital access functional store generation and mapping predictor 500 also evaluates sources 502*a*-502*n* (collectively "source 502), which represent different communication technologies 503*a*-503*c* for servicing the function 501.

The digital access functional store generation and mapping predictor 500 determines whether a source available score (e.g., the score from the state assessment optimizer as discussed herein) satisfies (e.g., is greater than) a threshold. If so, that source may be selected to service the function. For example, the digital access functional store generation and mapping predictor 500 may determine a best technology with a highest reliability score and a highest performance sink 504*a*, a best technology for common function and variable technology and a score of highest performance sink 504*b*, and a partial technology source mapping for a highest demand sink 504*c*.

Figure 6:
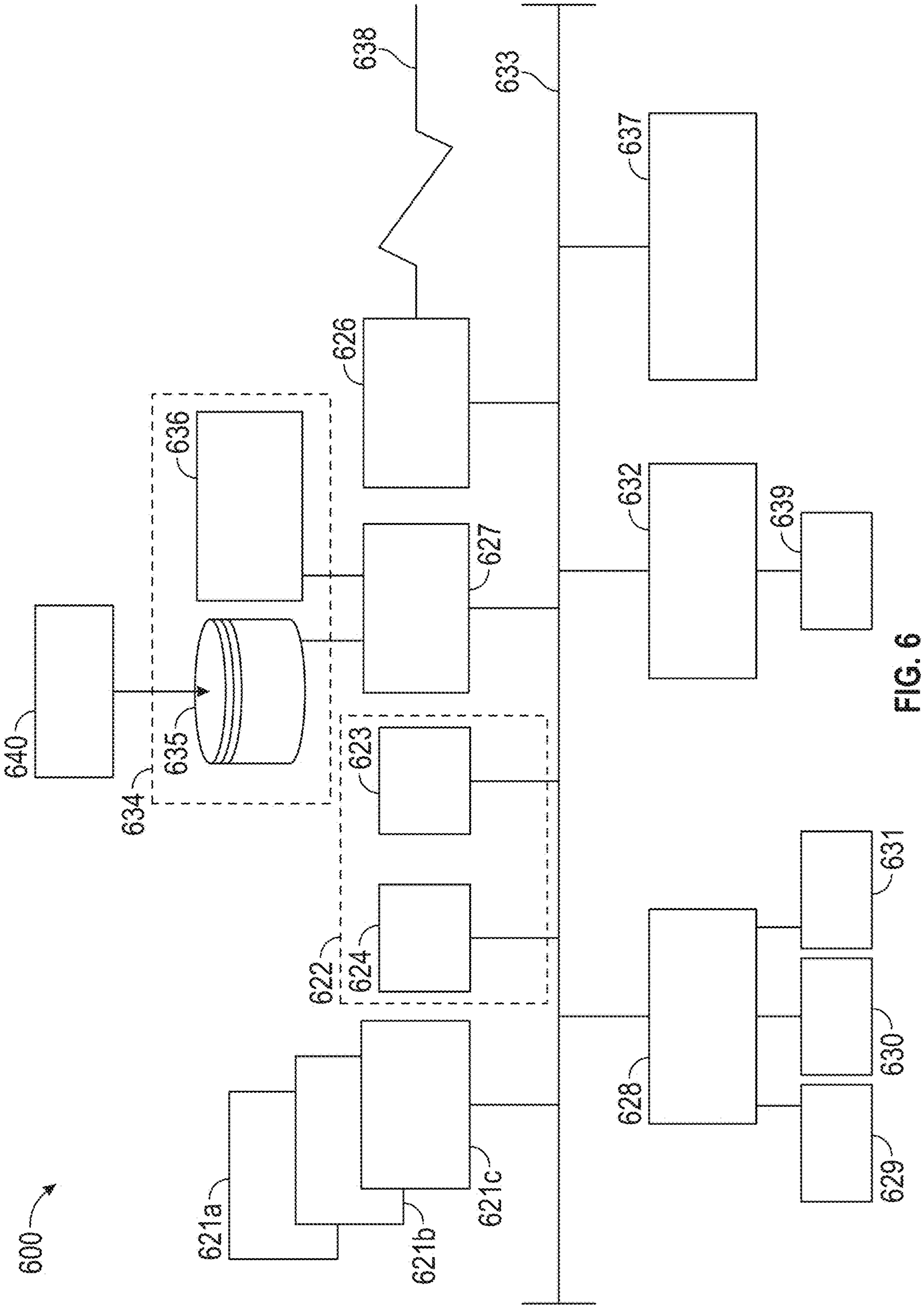
FIG. 6 is a block diagram of a processing system for implementing one or more embodiments described herein.

It is understood that one or more embodiments described herein is capable of being implemented in conjunction with any other type of computing environment now known or later developed. For example, FIG. 6 depicts a block diagram of a processing system 600 for implementing the techniques described herein. In accordance with one or more embodiments described herein, the processing system 600 is an example of a cloud computing node of a cloud computing environment. In examples, processing system 600 has one or more central processing units (referred to also as "processors" or "processing resources" or "processing devices") 621*a*, 621*b*, 621*c*, etc. (collectively or generically referred to as processor(s) 621 and/or as processing device(s)). In aspects of the present disclosure, each processor 621 can include a reduced instruction set computer (RISC) microprocessor. Processors 621 are coupled to a system memory 622 and/or various other components via a system bus 633. The system memory 622 can include one or more temporary and/or persistent memory devices, such as a random access memory (RAM) 623, a read-only memory (ROM) 624, and/or the like, including combinations and/or multiples thereof. The system bus 633 may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 635 and/or a storage device 636 or any other similar component. I/O adapter 627, hard disk 635, and storage device 636 are collectively referred to herein as mass storage 634.

Operating system 640 for execution on processing system 600 may be stored in mass storage 634. The network adapter 626 interconnects system bus 633 with an outside network 638 enabling processing system 600 to communicate with other such systems.

A display (e.g., a display monitor) 639 is connected to system bus 633 by display adapter 632, which may include a graphics adapter to improve the performance of graphics intensive applications and a video controller. In one aspect of the present disclosure, adapters 626, 627, and/or 632 may be connected to one or more I/O buses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit (GPU) 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including the system memory 622 and mass storage 634, input means such as keyboard 629 and mouse 630, and output capability including speaker 631 and display 639. In some aspects of the present disclosure, a portion of system memory 622 and mass storage 634 collectively store the operating system 640 to coordinate the functions of the various components shown in processing system 600.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for optimization and management of a digital access system for a vehicle, the method comprising:

monitoring a digital access function of the digital access system of the vehicle to detect an event;

determining, using a state assessment optimizer, whether the event indicates a failure of the digital access function of the digital access system; and responsive to determining that the event indicates a failure of the digital access function of the digital access system, assessing, using the state assessment optimizer, sub-events of the event that failed, evaluating, using the state assessment optimizer and based at least in part on the sub-events of the event that failed, other communication technologies to identify an alternative communication technology and re-executing, using the alternative communication technology, the digital access function that failed, wherein the alternative communication technology is identified based on a latency for an initially implemented communication technology being greater than a latency threshold, wherein assessing the sub-events comprises assessing performance of both pass and fail state after execution for executed sub-functions for a communication technology used for execution of the executed sub-functions, the performance comprising performance in measuring range, proximity, location, and inter-operability functions.

2. The computer-implemented method of claim 1, further comprising, responsive to determining that the event does not indicate a failure of the digital access function of the digital access system, assessing, using the state assessment optimizer, sub-events of the event that passed.

3. The computer-implemented method of claim 2, further comprising optimizing parameters used for execution of the sub-functions corresponding to the sub-events for a subsequent digital access function.

4. The computer-implemented method of claim 1, wherein the alternative communication technology is identified based on a packet error rate for an initially implemented communication technology being greater than a packet error rate threshold.

5. The computer-implemented method of claim 1, further comprising, subsequent to determining whether the event indicates the failure of the digital access function of the digital access system, reporting the event to the state assessment optimizer.

6. The computer-implemented method of claim 1, wherein the state assessment optimizer applies a machine learning technique.

7. The computer-implemented method of claim 6, wherein the machine learning technique utilizes a reinforcement learning architecture or a neural network architecture.

8. The computer-implemented method of claim 1, wherein the state assessment optimizer takes as input external factors relating to the digital access function, information about a subsequent digital access function, and static rules.

9. The computer-implemented method of claim 1, wherein the digital access function is a digital key function for the vehicle.

10. The computer-implemented method of claim 1, wherein the digital access function is an electrical charger interface function for the vehicle.

11. A vehicle comprising:

a digital access system comprising:

a memory comprising computer readable instructions; and a processing device for executing the computer readable instructions, the computer readable instructions controlling the digital access system to perform operations, the operations comprising:

monitoring a digital access function of the digital access system of the vehicle to detect an event;

determining, using a state assessment optimizer, whether the event indicates a failure of the digital access function of the digital access system; and responsive to determining that the event indicates a failure of the digital access function of the digital access system, assessing, using the state assessment optimizer, sub-events of the event that failed, evaluating, using the state assessment optimizer, other communication technologies to identify an alternative communication technology and re-executing, using the alternative communication technology, the digital access function that failed, wherein the alternative communication technology is identified based on a latency for an initially implemented communication technology being greater than a latency threshold; and storing learnings of the state assessment optimizer in a remote system communicatively coupled to the digital access system and retrieving the learnings from the remote system for a future digital access function use.

12. The vehicle of claim 11, wherein the operations further comprise:

responsive to determining that the event does not indicate a failure of the digital access function of the digital access system, assessing, using the state assessment optimizer, sub-events of the event that passed; and optimizing parameters for execution of sub-functions corresponding to the sub-events for a subsequent digital access function.

13. The vehicle of claim 11, wherein the alternative communication technology is identified further based on a packet error rate for the initially implemented communication technology being greater than a packet error rate threshold.

14. The vehicle of claim 11, wherein the alternative communication technology is identified based at least in part on the sub-events of the event that failed.

15. The vehicle of claim 11, wherein the operations further comprise, subsequent to determining whether the event indicates the failure of the digital access function of the digital access system, reporting the event to the state assessment optimizer.

16. The vehicle of claim 11, wherein the state assessment optimizer applies a machine learning technique.

17. A computer program product comprising a non-transitory computer readable storage medium having program instructions embodied therewith, the program instructions executable by at least one processor to cause the at least one processor to perform operations for optimization and management of a digital access system for a vehicle, the operations comprising:

monitoring a digital access function of the digital access system of the vehicle to detect an event;

reporting the event to a state assessment optimizer;

determining, using the state assessment optimizer, whether the event indicates a failure of the digital access function of the digital access system;

responsive to determining that the event indicates a failure of the digital access function of the digital access system, assessing, using the state assessment optimizer, sub-events of the event that failed and evaluating, using the state assessment optimizer, other communication technologies to identify an alternative communication technology and re-executing, using the alternative communication technology, the digital access function that failed, wherein the alternative communication technology is identified based on a latency for an initially implemented communication technology being greater than a latency threshold;

responsive to determining that the event does not indicate a failure of the digital access function of the digital access system, assessing, using the state assessment optimizer, sub-events of the event that passed and optimizing parameters used for execution of sub-functions corresponding to the sub-events for a subsequent digital access function; and storing learnings of the state assessment optimizer in a remote system communicatively coupled to the digital access system and retrieving the learnings from the remote system for a future digital access function use, wherein assessing the sub-events comprises assessing performance of both pass and fail state after execution for executed sub-functions for a communication technology used for execution of the executed sub-functions, the performance comprising performance in measuring range, proximity, location, and inter-operability functions.

18. The computer program product of claim 17, wherein the alternative communication technology is identified based at least in part on the sub-events of the event that failed.

19. The computer program product of claim 17, wherein the state assessment optimizer applies a machine learning technique.

* * * * *